(12) United States Patent
Cai

(10) Patent No.: US 6,205,410 B1
(45) Date of Patent: Mar. 20, 2001

(54) SYSTEM AND METHOD FOR BIT LOADING WITH OPTIMAL MARGIN ASSIGNMENT

(75) Inventor: Lujing Cai, Tinton Falls, NJ (US)

(73) Assignee: Globespan Semiconductor, Inc., Red Bank, NJ (US)

( * ) Notice: Subject to any disclaimer, the term of this patent is extended or adjusted under 35 U.S.C. 154(b) by 0 days.

(21) Appl. No.: 09/170,749

(22) Filed: Oct. 13, 1998

Related U.S. Application Data

(60) Provisional application No. 60/087,570, filed on Jun. 1, 1998.

(51) Int. Cl.[7] ....................................... H04B 1/40
(52) U.S. Cl. .................... 702/191; 702/189; 370/364; 375/260
(58) Field of Search .................... 702/191; 370/476, 370/252, 506, 343, 431, 464; 375/295, 220, 260, 377; 709/190, 195, 189

(56) References Cited

U.S. PATENT DOCUMENTS

| | | | |
|---|---|---|---|
| 5,521,906 | * | 5/1996 | Grube et al. ............... 370/252 |
| 5,619,505 | * | 4/1997 | Grube et al. ............... 370/476 |
| 6,073,179 | * | 6/2000 | Liu et al. ............... 709/229 |
| 6,075,821 | * | 6/2000 | Kao et al. ............... 375/260 |
| 6,084,906 | * | 7/2000 | Kao et al. ............... 375/220 |
| 6,094,459 | * | 7/2000 | Kao et al. ............... 375/295 |

\* cited by examiner

*Primary Examiner*—Marc S. Hoff
*Assistant Examiner*—Hien Vo
(74) *Attorney, Agent, or Firm*—Thomas, Kayden, Horstemeyer & Risley

(57) ABSTRACT

A system and method which establishes an optimum margin for each channel in a discrete multi-tone (DMT) transceiver. The present system entails a discrete multi-tone transceiver which comprises a processor and a memory. Stored on the memory is operating logic which directs the function of the processor. The operating logic includes bit allocation logic and signal-to-noise (SNR) variation logic. The SNR variation logic determines an variation in the signal-to-noise ratio for each channel. The bit loading logic then determines a bit loading configuration based upon the variation in the signal-to-noise ratio ascertained by the SNR variation logic. The SNR variation logic preferably includes logic to determine the variation in the signal-to-noise ratio by means of statistical analysis, however, other approaches to determining the variation in the signal-to-noise ratio may be employed.

15 Claims, 8 Drawing Sheets

US 6,205,410 B1

SYSTEM AND METHOD FOR BIT LOADING WITH OPTIMAL MARGIN ASSIGNMENT

CROSS REFERENCE TO RELATED APPLICATIONS

This application claims the benefit of co-pending U.S. provisional patent application entitled "Unequal Margin Assignment in the Bit Loading Process for DMT Transceivers" filed on Jun. 1, 1998 and afforded Ser. No. 60/087570.

FIELD OF THE INVENTION

This invention relates to the field of discrete multi-tone (DMT) data communication, and, more particularly, to the field of optimization of the signal-to-noise ratio margin of DMT channels.

BACKGROUND OF THE INVENTION

In data communications using discrete mulitone (DMT) technology, a serial data bit stream to be communicated is distributed among multiple channels and transmitted in parallel from a transmitting modem to a receiving modem. These channels are contained in bandwidth of approximately 1.104 megahertz. Each channel has a bandwidth of 4 kilohertz. The center frequencies of each band are separated by 4.3125 kilohertz.

It is often the case that interference with each channel may vary depending on the precise frequency band occupied by the particular channel. Some channels may experience little or no interference, while the interference on others may be so great as to make that particular channel unusable.

Because interference with individual channels may vary, conventional DMT modems establish a bit loading configuration in which the bit rate of individual channels varies based upon the signal-to-noise ratio of each channel. In order to determine the individual bit rates for each channel, the signal-to-noise ratio for each channel is ascertained. This is typically accomplished at the start up of data communication by transmitting a tone at the center frequency of each channel from the transmitting modem and then measuring the signal-to-noise ratio for each channel at the receiving modem.

After the signal-to-noise ratio is measured for each channel, it is a typical practice to subtract a common margin, typically 6 dB, from the measured signal-to-noise ratio of each channel to obtain a transmission signal-to-noise ratio at which to achieve a bit error rate of approximately $10^{-7}$. An appropriate bit rate is assigned to the channel based upon the transmission signal-to-noise ratio obtained.

Such conventional approaches suffer from the subtraction of a common margin from all of the measured signal-to-noise ratios of each channel. It is automatically assumed that the common 6 dB margin is appropriate to compensate for the variation in the signal-to-noise ratio for each channel. However, some channels may experience greater variation in the signal-to-noise ratio than others. Thus, in some cases the common margin may be too great, resulting in a bit rate that is unnecessarily slow. In other cases the common margin may be too small, resulting in a bit rate that is too high which translates into an unnecessarily high bit error rate.

SUMMARY OF THE INVENTION

It is an objective of the present invention to provide for a DMT modem which establishes an optimum margin for each DMT channel. In furtherance of this objective, the present invention entails a discrete multi-tone (DMT) transceiver which comprises a processor and a memory. Stored on the memory is operating logic which directs the function of the processor. The operating logic includes bit allocation logic and signal-to-noise (SNR) variation logic. The SNR variation logic determines an variation in the signal-to-noise ratio for each channel. The bit loading logic then determines a bit loading configuration based upon the variation in the signal-to-noise ratio ascertained by the SNR variation logic. The SNR variation logic preferably includes logic to determine the variation in the signal-to-noise ratio by means of statistical analysis, however, other approaches to determining the variation in the signal-to-noise ratio may be employed.

In accordance with another aspect of the present invention, a method is provided for establishing the bit loading configuration of a discrete multi-tone (DMT) transceiver comprising the steps of determining a variation in a signal-to-noise ratio for each of the channels, and, determining bit loading configuration for each of the channels based on the a variation in the signal-to-noise ratio for each of the channels.

Other features and advantages of the present invention will become apparent to one with skill in the art upon examination of the following drawings and detailed description. It is intended that all such additional features and advantages be included herein within the scope of he present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
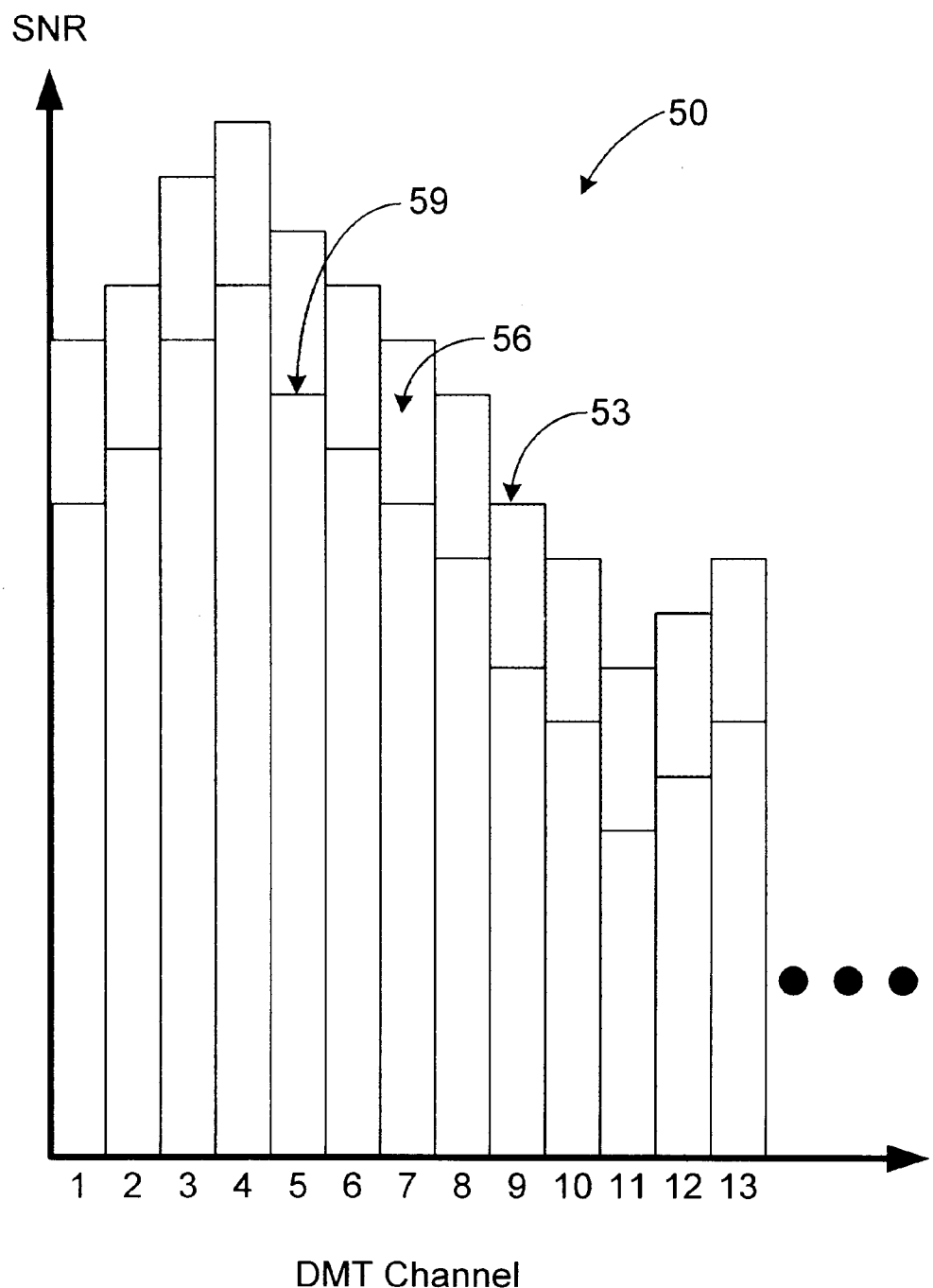
FIG. 1 is a graph showing conventional signal-to-noise ratio margins for a plurality of discrete multi-tone channels.

Referring to FIG. 1, shown is a graph 50 which details the signal-to-noise ratio (SNR) of the channels of a conventional discrete multi-tone (DMT) data link. For each DMT channel, a measured SNR 53 is shown. A common SNR margin 56 is subtracted from the measured SNR 53 for each DMT channel resulting in an SNR threshold 59. The SNR threshold 59 is the signal-to-noise ratio employed to achieve a $10^{-7}$ bit error rate at the selected bit rate per each DMT channel.

Figure 2:
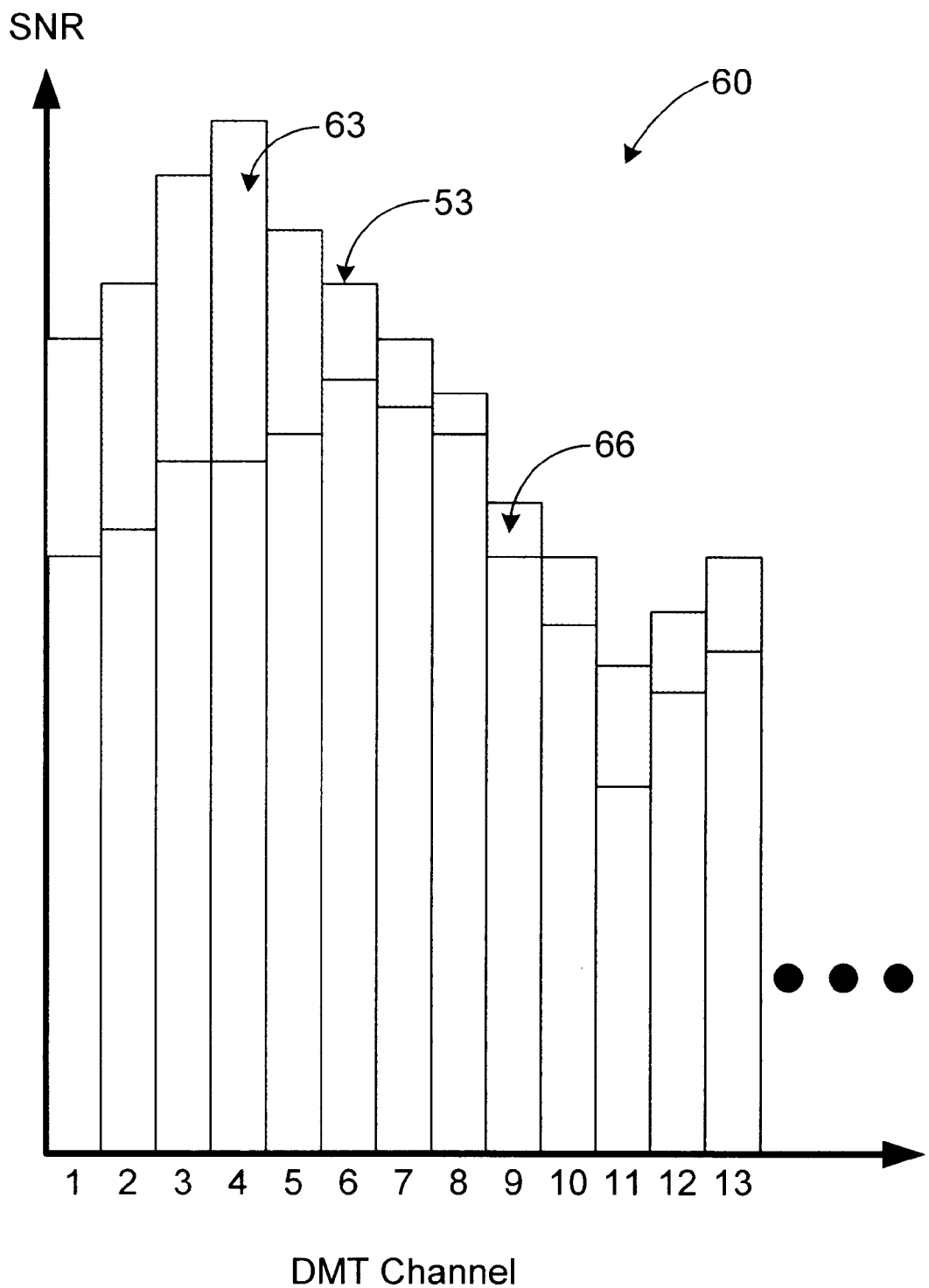
FIG. 2 is a graph showing the signal-to-noise ratio margins for a plurality of discrete multi-tone channels according an embodiment of the present invention.

Turning then, to FIG. 2, shown is a graph 60 which details the SNR of the channels of a DMT data link according to the present invention. Once again, for each DMT channel, a measured SNR 53 is shown. However, the SNR margins employed vary from channel to channel, depending upon the potential SNR variation experienced during the connection. For example, a large margin 63 is used in channel 4, whereas a small margin 66 is used for channel 9. The varying margins allow the DMT channels to be used with a maximum of efficiency, while ensuring a low bit error rate.

Figure 3:
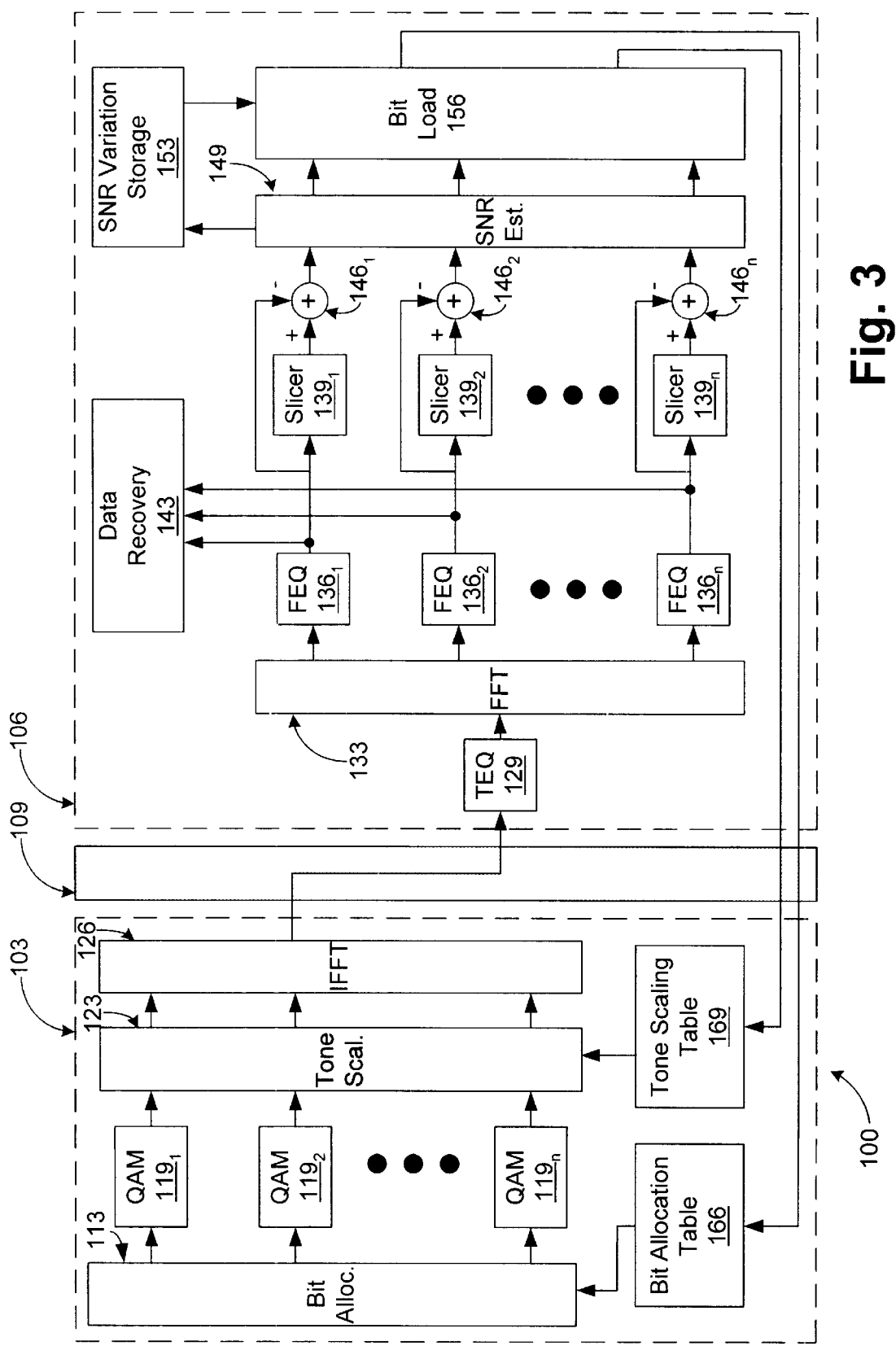
FIG. 3 is a block diagram of a discrete multi-tone data link according to an embodiment of the present invention.

Referring to FIG. 3, shown is a block diagram showing the functionality of a discrete multi-tone (DMT) data link 100 according to the present invention. The DMT data link 100 includes the functionality of a transmitter 103 and a receiver 106 which communicates across a communications channel 109. It is understood that the functionality of the transmitter 103 and receiver 106 are generally combined in a single DMT modem so that it may transmit and receive data communication to and from other modems and that the transmit and receive functions are shown individually herein for purposes of illustration and clarity. The transmitter 103 includes a data input 113 which is coupled to a bit allocation block 116. The bit allocation block 116 is further coupled to quadrature amplitude modulator (QAM) blocks $119_{1-n}$ which in turn are coupled to the tone scaling block 123. The tone scaling block 123 is coupled to the inverse fast fourier transform block 126. The output of the inverse fast fourier transform block 126 is coupled to the communications channel 109.

The receiver 106 is coupled to the communications channel 109 and receives the DMT signal from the inverse fast fourier transform block 126 at the time domain equalizer block 129. The time domain equalizer block 129 is coupled to the fast fourier transform block 133 which in turn is coupled to multiple frequency domain equalizer blocks $136_{1-n}$. Each frequency domain equalizer block $136_{1-n}$ is coupled to a respective slicer block $139_{1-n}$, data adder block $146_{1-n}$, and to a data recovery circuitry block 143. The output of each slicer block $139_{1-n}$ is provided to a respective adder block $146_{1-n}$ which, in turn, provides an output to a signal-to-noise estimation block 149. The noise estimation block 149 provides outputs to both a signal-to-noise variation storage block 153 and a bit loading block 156. The bit loading block 156 provides bit allocation information to a bit allocation table 166 and tone scaling information to a tone scaling table 169.

To explain the functionality of the discrete multi-tone (DMT) data link 100 as shown by the block diagram of FIG. 3, a serial data stream enters the bit allocation block 116 where the serial data is distributed among multiple DMT channels, each DMT channel corresponding to an individual quadrature amplitude modulation (QAM) block $119_{1-n}$. Note that the bit rates of the individual DMT channels may vary depending on the interference experienced by each DMT channel. In cases of greater interference, the bit rate is slower and vice versa. The actual bit rates of the DMT channels are determined from the bit allocation table 166.

The QAM blocks $119_{1-n}$ generally produce a modulated tone which is then scaled based upon a desired signal-to-noise ratio for each individual DMT channel in the tone scaling block 123 according to the tone scaling table 169. The multiple DMT channels are then combined by the inverse fast fourier transform block 126 and transmitted across the channel 109 to the time domain equalizer block 129 of the receiver 106. The time domain equalizer (TEQ) block 129 serves to shorten the channel, thereby minimizing distortion due to the channel 109 in the time domain. The output of the TEQ block 129 is coupled to a fast fourier transform block 133 which converts the output of the TEQ block 129 into the frequency domain and distributes the multiple DMT channels among the frequency domain equalizer (FEQ) blocks $136_{1-n}$. The FEQ blocks $136_{1-n}$ correct any phase and amplitude distortion in the frequency domain. The output of the individual FEQ blocks $136_{1-n}$ are provided to respective slicer blocks $139_{1-n}$ and the data recovery block 143. In the data recovery block 143, the serial data signal is reconstructed from the DMT channels in a process which is generally the reverse of that performed by the bit allocation block 116.

The slicer blocks $139_{1-n}$ decide which QAM signal is transmitted by the QAM blocks $119_{1-n}$. The output of the FEQ blocks $136_{1-n}$ is subtracted from the estimated QAM signal in the adder blocks $146_{1-n}$, resulting in an output from which an estimate of the signal-to-noise ratio of the individual DMT channels is determined in the signal-to-noise (SNR) estimator block 149. The SNR estimator block 149 provides the SNR estimate for each DMT channel to the SNR variation storage block 153. The SNR variation storage block 153 uses this information to maintain SNR variation information over time such as, for example, a maximum and minimum SNR for each DMT channel. The SNR variation information is provided to the bit loading block 156. The SNR estimate for each DMT channel is also provided to the bit loading block 156 from the SNR estimator block 149.

In accordance with the present invention, the precise bit allocation and tone scaling is determined based upon the SNR estimate and the optimum margin estimate determined from the SNR variation in the bit loading block 156 at the startup of data communication. The bit allocation and tone scaling information is transmitted across the communications channel 109 to the transmitter 103 to the bit allocation table 166 and the tone scaling table 169. The SNR estimate is determined at startup or during data communication by transmitting a tone at the center frequency of each DMT channel and the SNR estimate is determined. The SNR variation is stored in memory and is updated over time during multiple uses of the data link 100.

The actual distribution of the data input 113 among the multiple DMT channels by the bit allocation block 116 is performed pursuant to the bit allocation table 166. Likewise, the actual tone scaling performed on each DMT channel by the tone scaling block 123 is performed pursuant to the tone scaling table 169.

Figure 4:
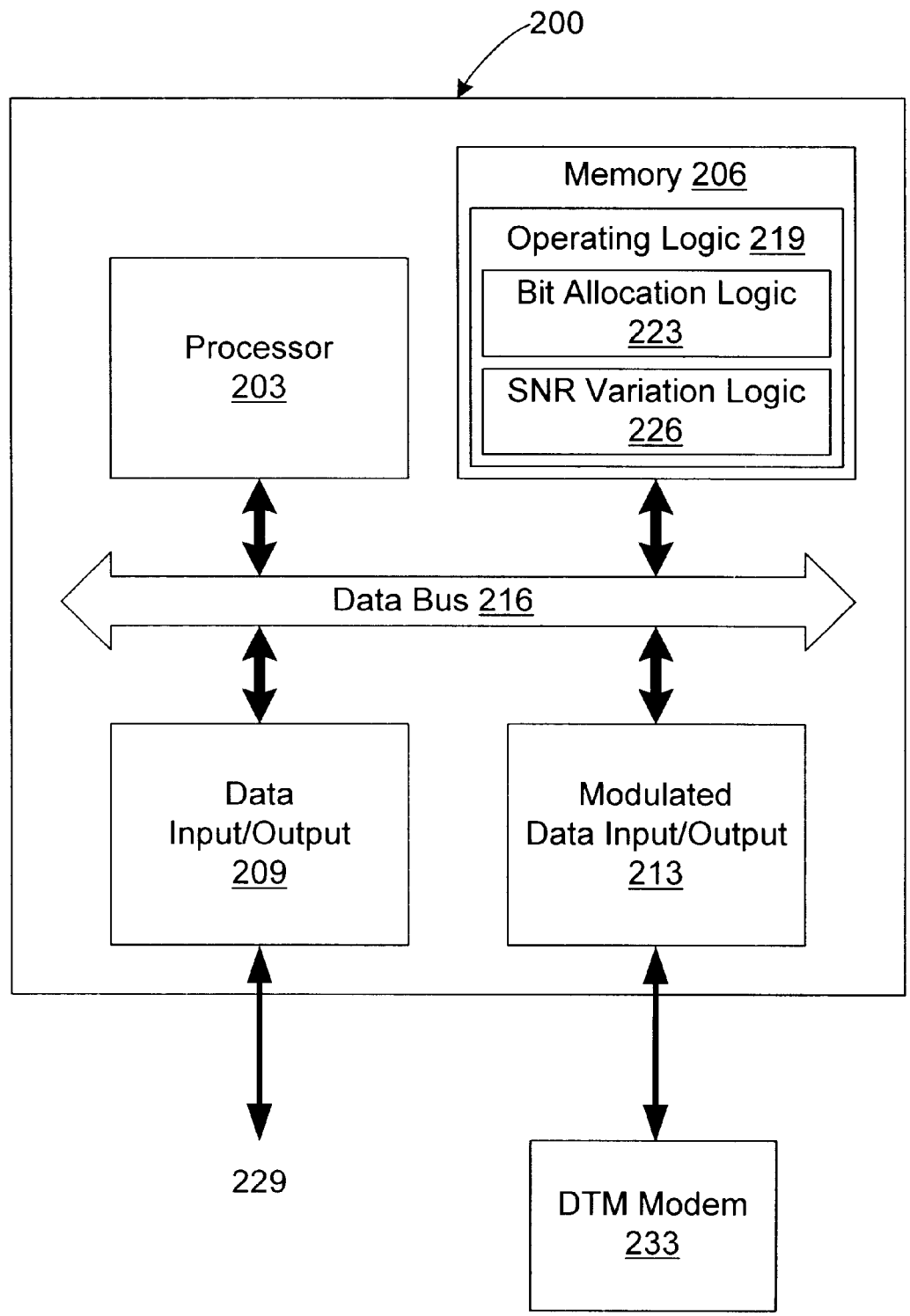
FIG. 4 is a block diagram of a discrete multi-tone modem according to an embodiment of the present invention.

Turning to FIG. 4, shown is a DMT modem 200 which combines the functions of the transmitter 103 (FIG. 3) and receiver 106 (FIG. 3) according to an embodiment of the present invention. The DMT modem 200 includes a processor 203, a memory 206, a data input/output 209, and a modulated data input/output 213, all electrically coupled to a common data bus 216. The processor 203 operates according to the operating logic 219 stored on the memory 206. The operating logic 219 includes bit allocation logic 223 and the SNR variation logic 226. A data signal 229 is received or transmitted by the data input/output 209 to a peripheral device which processes the data itself. Likewise, a modulated data signal is received and transmitted through the modulated data input/output 213 to and from a second DMT modem 233 linked by a telephone channel.

To describe the operation of the DMT modem 200, the operating logic 206 is executed by the processor 203 to conduct DMT data communication. In particular, at start up, the bit allocation logic 223 is executed, thereby establishing the bit loading configuration to be used by the second DMT modem 233 in transmitting a modulated data signal to the DMT modem 200. The SNR variation logic 226 is executed at predetermined times to ascertain the variation of the signal-to-noise ratio for each individual DMT channel from which the margin for each channel is calculated.

Figure 5:
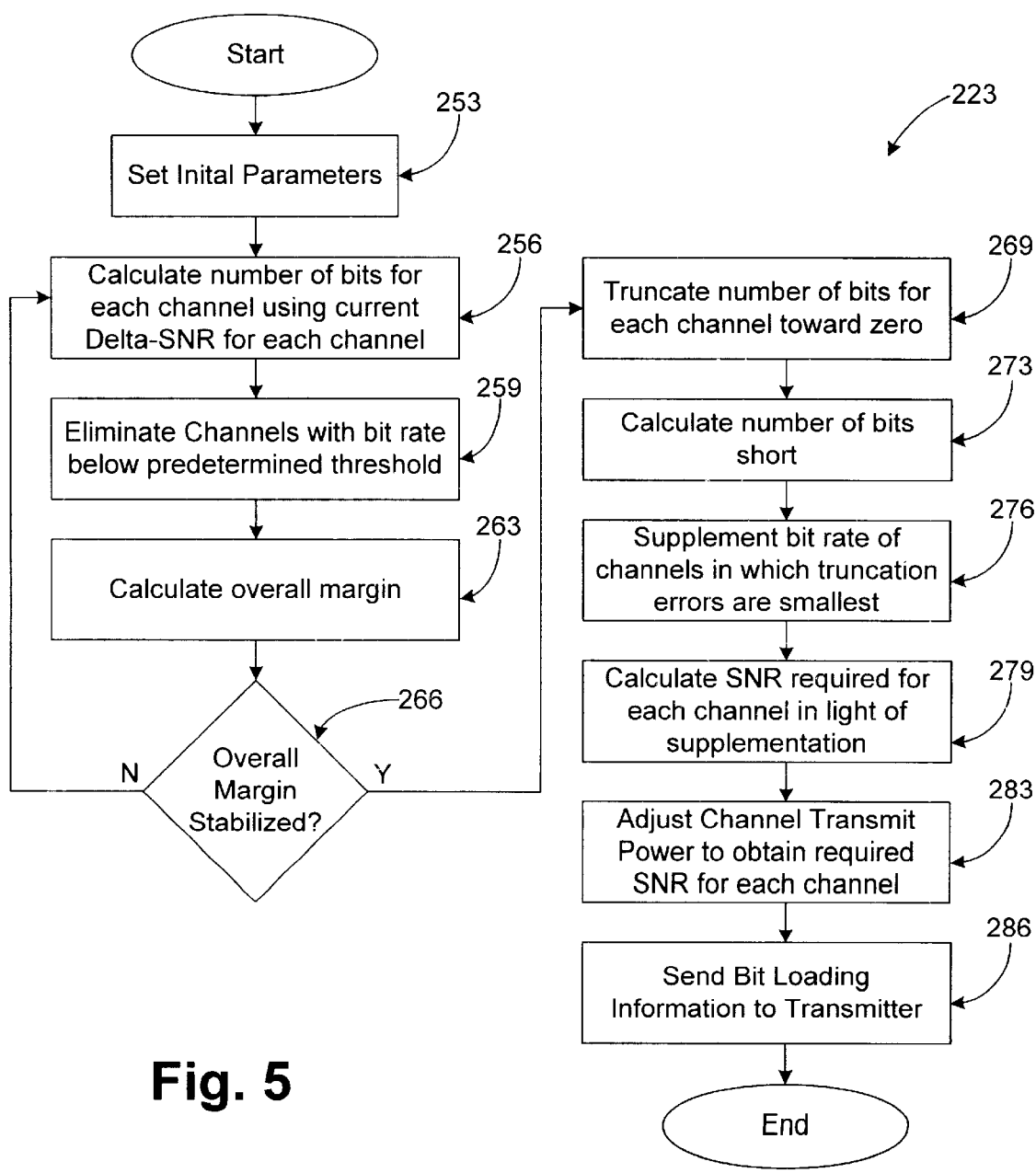
FIG. 5 is a flow chart of the bit allocation logic executed by the discrete multi-tone modem of FIG. 4.

Turning then, to FIG. 5, shown is a flow diagram of the bit allocation logic 223. Note that the bit allocation logic 223 discussed herein is an example of any number of bit allocation approaches which may be employed. The bit allocation logic 223 begins with block 253 in which the initial parameters are set. In particular, the parameters include an overall margin $\gamma_0$ which is set to 0 dB, a total number of used DMT channels $N_{USED}$ which is set equal to the actual number of DMT channels which is 256 in the preferred embodiment, and a total bit rate $b_0$ which is an assumed bit rate of the DMT modem 200 (FIG. 4). The overall margin is an average of the margins for each channel in the timed domain. Next, the bit allocation logic 223 proceeds to block 256 in which the bit rate b'(i) for each DMT channel is calculated using the equation $$b'(i) = \log 2(1+10^{(SNR(i)-(9.8+\gamma(i)))/10}),$$

where SNR(i) is the signal-to-noise ratio of each DMT channel, respectively, and $\gamma(i)$ is defined by the equation $$\gamma(i) = \gamma_0 \Delta SNR(i) \text{dB},$$

where $\gamma_0$ is the overall margin and $\Delta SNR(i)$ is defined as the variation of the signal-to-noise ratio for each DMT channel. The determination of the signal-to-noise variation $\Delta SNR(i)$ is discussed later. Note, however, that the signal-to-noise variation $\Delta SNR(i)$ may be employed in other approaches used to calculate the bit allocation, the above equations being an example.

The bit allocation logic 223 then proceeds to block 259 in which those DMT channels with a calculated bit rate b'(i) that are less than a predetermined threshold are eliminated from consideration. In the preferred embodiment, the $i^{th}$ DMT channel is eliminated where b'(i)<2. When a DMT channel is eliminated, the total number of used DMT channels is adjusted where $N_{USED} = N_{USED} - 1$. Next, the bit allocation logic 223 proceeds to block 263 where the overall margin $\gamma_0$ is recalculated using the equation $$\gamma 0 = \gamma 0 + 10 \log 10 \left( 2^{\frac{\Sigma_{i \in A} b'(i) - b_0}{N_{USED}}} \right) \text{dB},$$

where the set A is defined as the number of active DMT channels used. Thereafter, in block 266, a determination is made as to whether the overall margin $\gamma_0$ is stabilized such that $\gamma_0(n+1) - \gamma_0(n) < \delta$, where $\delta$ is a predetermined value. If the overall margin is not stabilized, then the bit allocation logic 223 reverts back to block 256. If the overall margin $\gamma_0$ is stabilized, then the bit allocation logic 223 proceeds to block 269 in which the calculated bit rate b'(i) for each of the i DMT channels are truncated to the nearest integer toward zero so that b(i)=[b'(i)].

Next the bit allocation logic 223 proceeds to block 273 in which the collective bit rate achieved by adding the truncated bit rates b(i), i.e.

$$\sum_{i \in A} b(i),$$

is subtracted from the total bit rate $b_0$ to obtain the shortfall $N_{SHORT}$ in the bit rate as compared to the total bit rate $b_0$ using the equation $$N_{SHORT} = b_0 - \sum_{i \in A} b(i).$$

Next, in block 276 the bit rates b(i) are supplemented by 1, where b(i)=b(i)+1 for those DMT channels in which the truncate error b'(i)–b(i) is smallest to make up for the shortfall $N_{SHORT}$. After the bit rates b(i) have been supplemented in block 276, the bit rates b(i) are employed in the bit allocation for the DMT channels.

Once the bit allocation for the DMT channels is finally determined in block 276, the bit allocation logic 223 proceeds to block 276 in which the signal-to-noise ratio required for each DMT channel in light of the supplementation of block 279. The required signal-to-noise ratio for each DMT channel SNR(i) is calculated using the equation $$SNR'(i) = 10 \log 10(2^{b(i)} - 1) + 9.8 + \gamma(i).$$

Next, in block 283, SNR'(i) is realized for each DMT channel by adjusting the transmitter power of the individual DMT channels accordingly. The magnitude of the power adjustment $\Delta P(i)$ for each DMT channel is calculated using the equation $$\Delta P(i) = SNR'(i) - SNR(i) + \alpha,$$

where $\alpha$ is defined by $$\alpha = 10 \log 10 \left( \frac{N}{\sum_i (SNR'(i) - SNR(i))} \right)$$

to ensure that the total transmitter power is unchanged where N is equal to the total number of channels. Finally, the bit allocation logic 223 proceeds to block 286 in which the bit allocation is communicated to the bit allocation table 166 (FIG. 3) and the power adjustments $\Delta P(i)$ are communicated to the tone scaling table 169 (FIG. 3). The bit allocation is then used by the transmitter 103 (FIG. 3) in configuring the DMT transmission. Note that the resulting overall margin can be found by the equation $$\gamma_a = \gamma_0 + \alpha + \frac{1}{N} \sum_i \Delta SNR(i).$$

Turning back to FIG. 4, note that in block 256 (FIG. 5) the calculation employs the variation of the signal-to-noise ratio $\Delta SNR(i)$. Consequently, the operating logic 219 includes the SNR variation logic 226 to determine the signal-to-noise ratio variation $\Delta SNR$ for each DMT channel.

Figure 6:
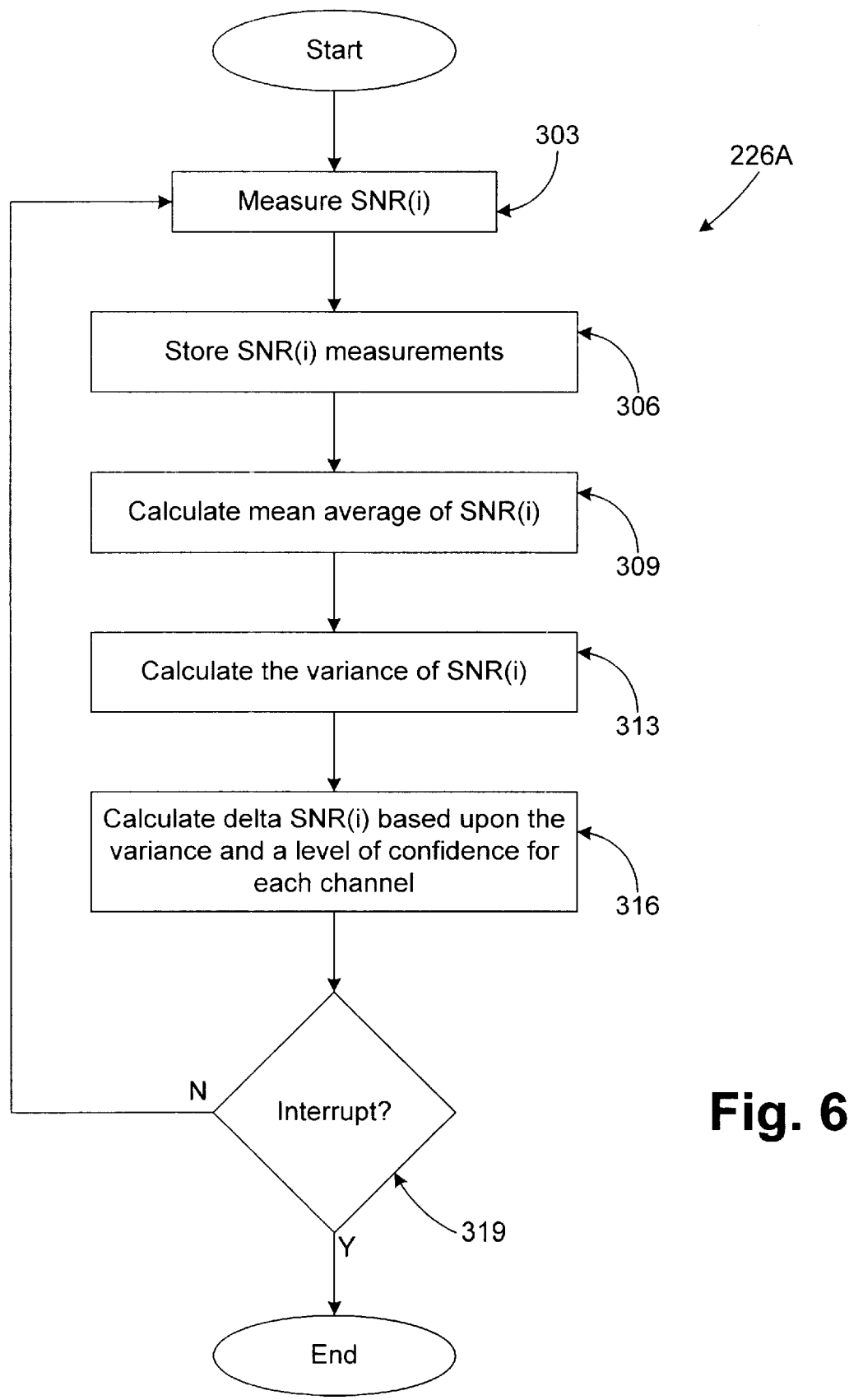
FIG. 6 is a flow chart of a first alternative of the signal-to-noise ratio variation logic executed by the discrete multi-tone modem of FIG. 4.

Referring to FIG. 6, shown is a flow chart which details a first alternative SNR variation logic 226A. In block 303, measurements for SNR(i) are taken. The SNR variation logic 226A assumes that a predetermined number of M SNR measurements are taken for each channel over time and stored in a memory array which holds the predetermined number of measurements M for each channel, denoted by $$SNR(i,n), n=1, 2, \ldots, M$$

where i is the channel index, and n is a time index which includes a total number of time periods M. Next, in block 306, the new values measured for SNR(i) are stored in the memory array on a first-in-first-out (FIFO) basis so as to maintain the last M number of SNR measurements taken for each channel. The amount of memory necessary to store the SNR(i,n) is equal to M×N, where N is equal to the number of channels. The actual number M of time periods stored is application specific, depending in part on the amount of memory available for storage and the number of samples one wishes to maintain in memory for each channel for the following statistical calculations.

Then, in block 309, the mean averages $\overline{SNR(i)}$ of the signal-to-noise ratios are calculated where $$\overline{SNR(i)} = \frac{1}{M} \sum_{n=1}^{M} SNR(i, n)$$

Next, in block 313, the variance $\sigma(i)^2$ is calculated where $$\sigma(i)^2 = \frac{1}{M} \sum_{n=1}^{M} (SNR(i, n) - \overline{SNR(i)})^2$$

In block 316, the variation in the signal to noise ratio $\Delta SNR(i)$ is calculated by the equation $$\Delta SNR(i) = (\sqrt{\sigma(i)^2})C$$

where C is a predetermined confidence variable C which is specified based on prior experience with the particular channel. For greater reliability, C is larger, and vice versa.

Finally, in block 319, it is determined whether an interrupt has occurred. If so, then the SNR variation logic 226A ends. If not, then the SNR variation logic 226A reverts back to block the variation in the signal to noise ratio $\Delta SNR(i)$. Thus, updated values for the variation in the signal to noise ratio $\Delta SNR(i)$ may be determined on an ongoing basis.

Figure 7:
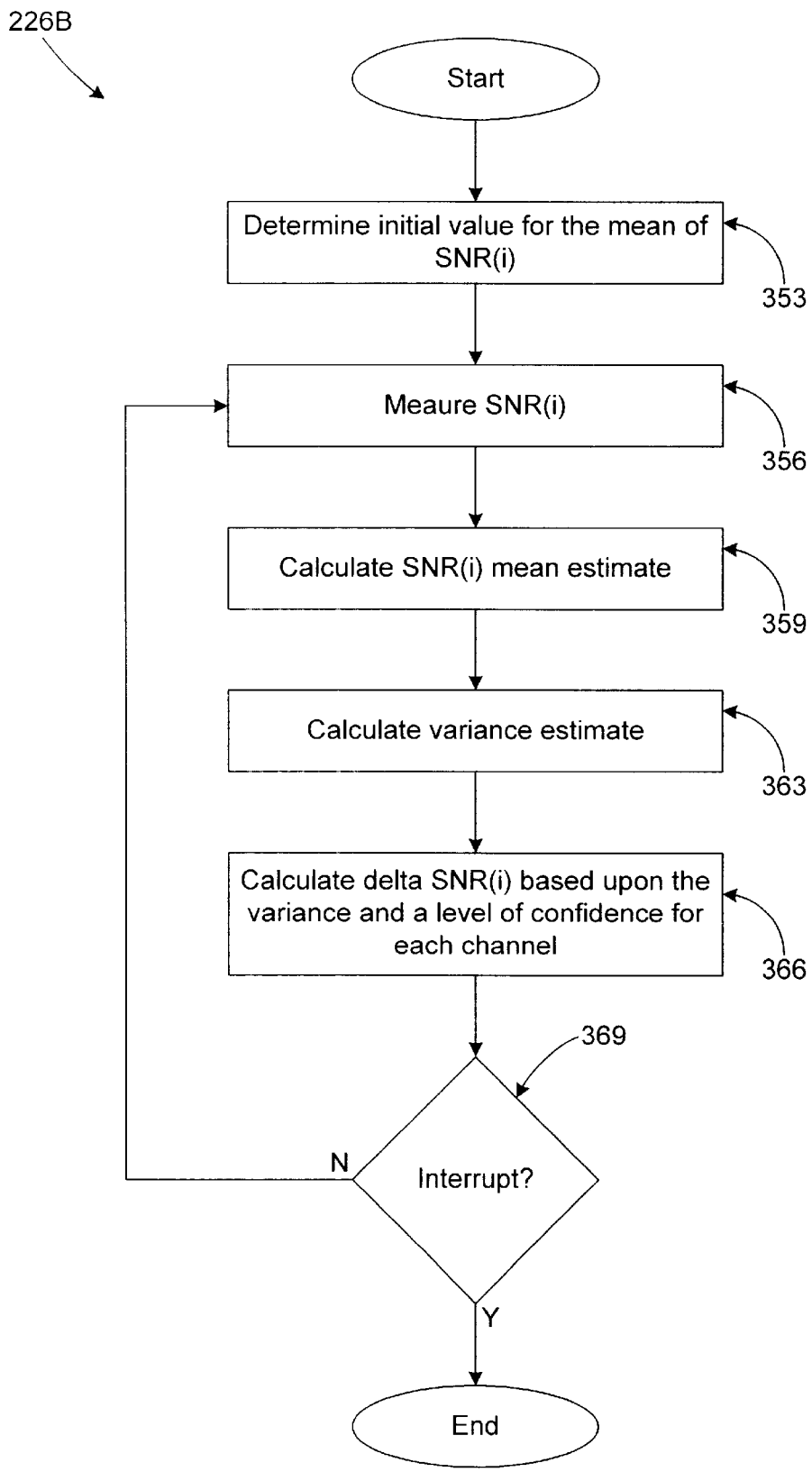
FIG. 7 is a flow chart of a second alternative of the signal-to-noise ratio variation logic executed by the discrete multi-tone modem of FIG. 4.

Turning then, to FIG. 7, shown is a flow chart which details a second alternative SNR variation logic 226B. In block 353, the SNR variation logic 226B determines initial values for $\overline{SNR(i)}$ and places them in memory. The determination of $\overline{SNR(i)}$ may be calculated in a manner similar the calculations of the SNR variation logic 226A (FIG. 6). In block 356, values for SNR(i) are measured and stored in memory. Thereafter, in block 359, an updated estimate of $\overline{SNR(i)}$ is calculated using the equation $$\overline{SNR(i)} = (1-\alpha)\overline{SNR(i)} + \alpha SNR(i, n)$$

where $\alpha$ is a positive time constant much smaller than 1. Thereafter, in block 363, an estimate of the variances $\sigma(i)^2$ is calculated according to the equation $$\sigma(i)^2 = (1-\beta)\sigma(i)^2 + \beta(SNR(i, n) - \overline{SNR(i)})^2$$

where $\beta$ is a positive time constant much smaller than 1. Next, in block 366, the variation in the signal to noise ratio $\Delta SNR(i)$ is calculated by the equation $$\Delta SNR(i) = (\sqrt{\sigma(i)^2})C$$

where, once again, C is a predetermined confidence variable C which is specified based on prior experience with the particular channel. For greater reliability, C is larger, and vice versa. The second embodiment is advantageous in requiring less memory than the first alternative in that there is no need to store the number of time periods M to obtain updated values for $\overline{SNR(i)}$. Instead, only initial values for $\overline{SNR(i)}$ are necessary. The SNR variation logic 226B is repeated for each subsequent measurement of the signal-to-noise ratios SNR(i,n).

Finally, in block 369, it is determined whether an interrupt has occurred. If so, then the SNR variation logic 226B ends. If not, then the SNR variation logic 226B reverts back to block 356. Thus, updated values for the variation in the signal to noise ratio $\Delta SNR(i)$ may be determined on an ongoing basis.

Figure 8:
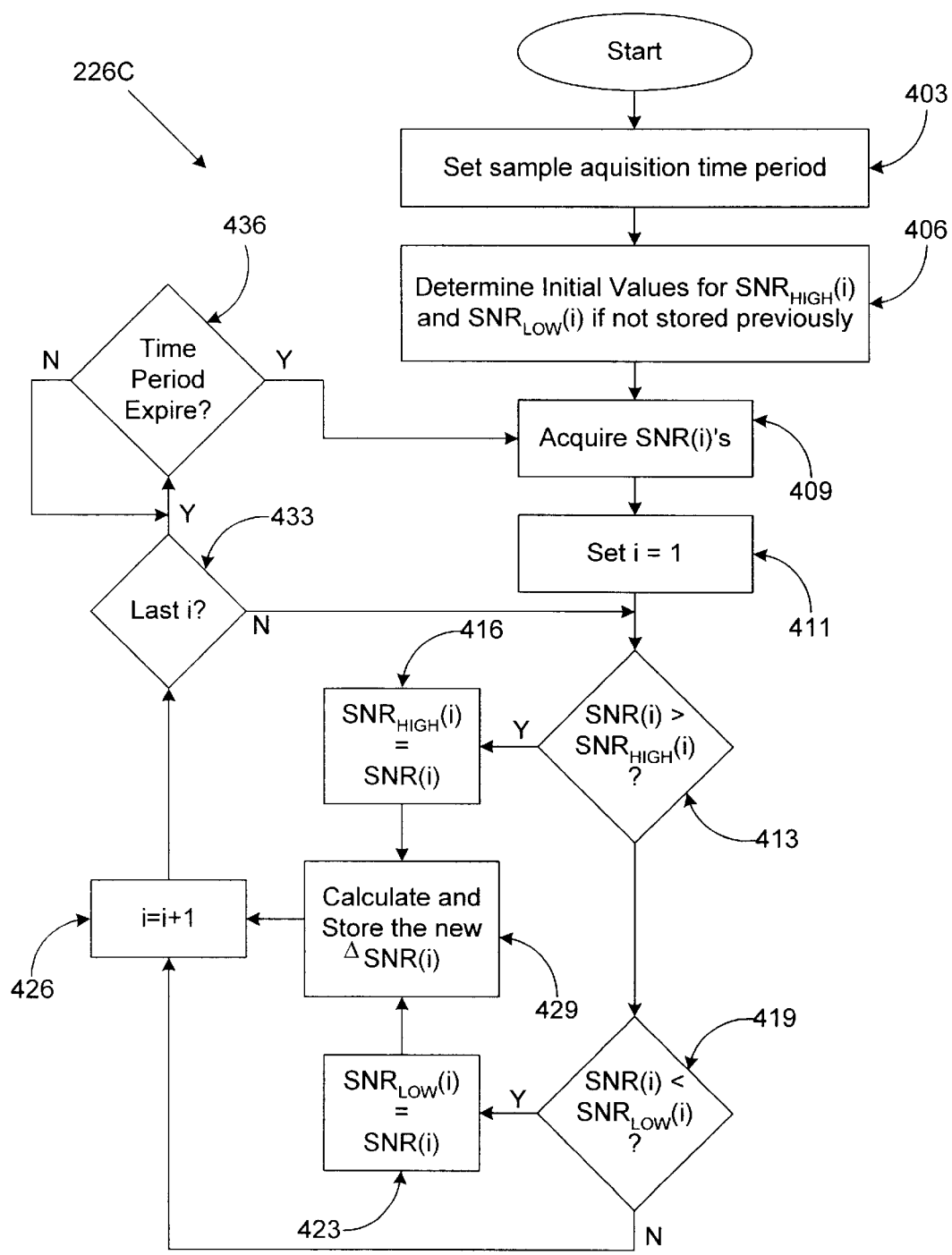
FIG. 8 is a flow chart of a third alternative of the signal-to-noise ratio variation logic executed by the discrete multi-tone modem of FIG. 4.

With reference to FIG. 8, shown is a flow chart which details a third alternative SNR variation logic 226C. Given that the signal-to-noise ratio of a particular DMT channel may vary over time, the SNR variation logic 226C periodically samples the signal-to-noise ratio for each DMT channel and stores the maximum signal-to-noise ratio $SNR_{HIGH}$ and the minimum signal-to-noise ratio $SNR_{LOW}$ experienced on each DMT channel. The SNR variation $\Delta SNR$ for each DMT channel is calculated by subtracting $SNR_{LOW}$ from $SNR_{HIGH}$.

With this in mind, the SNR variation logic 226C begins with block 403 in which the time is set for periodic sampling of the signal-to-noise ratios of each DMT channel while the DMT modem 200 (FIG. 4) is used. Note that another approach may be used in which periodic sampling is not employed, but the sampling of the each DMT channel is accomplished only at startup or according to some other predetermined criteria.

The SNR variation logic then proceeds to block 406 in which initial values are determined for $SNR_{HIGH}(i)$ and $SNR_{LOW}(i)$ for each DMT channel if they have not been previously stored from prior use of the DMT modem 200. This may be accomplished by sampling the signal-to-noise ratios of each DMT channel until two unequal values are obtained and then assigning the greater of the two to be $SNR_{HIGH}(i)$ and the lower value to be $SNR_{LOW}(i)$.

Once initial values are determined for $SNR_{HIGH}(i)$ and $SNR_{LOW}(i)$, the SNR variation logic 226C proceeds to block 409 in which a sample of the signal-to-noise ratio SNR(i) of each DMT channel is acquired. Thereafter, in block 411, a loop variable i which corresponds to the individual DMT channels is set to zero and the SNR variation logic proceeds to block 413, where the acquired signal-to-noise ratio SNR (i) is compared with $SNR_{HIGH}(i)$. If SNR(i) is greater than $SNR_{HIGH}(i)$, then the SNR variation logic 226C proceeds to block 416. If SNR(i) is less than or equal to $SNR_{HIGH}(i)$, then the SNR variation logic 226C proceeds to block 419. In block 416, $SNR_{HIGH}(i)$ is set equal to the acquired signal-to-noise ratio SNR(i). If the SNR variation logic 226C proceeds to block 419, then the acquired signal-to-noise ratio SNR(i) is compared with $SNR_{LOW}(i)$. If SNR(i) is less than $SNR_{LOW}(i)$, then the SNR variation logic 226C moves to block 423 in which $SNR_{LOW}(i)$ is set equal to SNR(i). On the other hand, if SNR(i) is greater than or equal to $SNR_{LOW}(i)$, then the SNR variation logic 226C progresses to block 426.

From blocks 416 or 423, the SNR variation logic 226C progresses to block 429 in which the a new signal-to-noise variation $\Delta SNR(i)$ is calculated where $\Delta SNR(i) = SNR_{HIGH}(i) - SNR_{LOW}(i)$. The new value for $\Delta SNR(i)$ is then stored for use as described previously. Thereafter, the SNR variation logic 226C moves to block 426 in which the loop variable i is incremented by 1. The SNR variation logic 226C then proceeds to block 433 in which it is determined if the loop variable i has reached a value equal to the number of DMT channels, which is preferably 256. If the loop variable i has not yet been incremented beyond the number of DMT channels, then the SNR variation logic 226C reverts back to block 413 to repeat the process with the next DMT channel. If the loop variable i has been incremented beyond the number of DMT channels, then the SNR variation logic 226C proceeds to block 436 in which it is determined if the sample acquisition time period is tolled. When the time period tolls, the SNR variation logic 226C reverts back to block 409 where the above process is repeated. If the sample acquisition time period is not tolled, the then SNR variation logic 226C stays at block 436 until this condition occurs. Note if there is no sample acquisition time period to toll, such as would be the case if the SNR variation logic 226C was only applied at the startup of data communication, then the SNR variation logic 226C would end at block 436.

Note that the DMT modem 200 advantageously includes a reset which, when activated, erases the values $SNR_{HIGH}(i)$, $SNR_{LOW}(i)$, and $\Delta SNR(i)$ for each DMT channel, replacing them with zero. This allows the DMT modem 200 to adapt values for $\Delta SNR(i)$ for a new communications channel 109 (FIG. 3) when the DMT modem 200 is moved.

The SNR variation logic 226 may determine the signal-to-noise variation $\Delta SNR(i)$ for each channel using further approaches. For example, $\Delta SNR(i)$ can simply be preset based on measurements of the channel at installation or some subsequent time or based upon other a priori knowledge of the behavior of the channel. Additionally, the measured values for $\Delta SNR(i)$ can be stored to from which to determine a running average. In this case, a backlog of a predetermined number of values for $\Delta SNR(i)$ for each channel is stored in a shifted memory which acts as a first-in-first-out storage device. When a new value for $\Delta SNR(i)$ is determined, the backlog is shifted, throwing out the oldest value and shifting in the newest measurement. An average of the new set of values is then taken to determine an updated value for $\Delta SNR(i)$.

The decision of the precise version of the SNR logic 226 to employ is application specific. The adaptive approaches to determining the signal-to-noise variation $\Delta SNR(i)$ as discussed herein provides an advantage in that the signal-to-noise variation $\Delta SNR(i)$ is continually updated over time so that the DMT modem 200 may use this updated information to establish the data link using accurate values for $\Delta SNR(i)$. As a result, the optimum margins are calculated for each DMT channel, which in turn translates into an optimum bit rate for each DMT channel while ensuring a desired bit error rate which is, for example, $10^{-7}$.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A bit loading system in a discrete multi-tone (DMT) transceiver having a plurality of channels, the bit loading system comprising:
    at least one processor;
    a memory;
        operating logic stored on the memory, the processor operating according to the operating logic, the operating logic comprising:
        signal-to-noise variation logic to determine a variation in a signal-to-noise ratio for each of the channels; and
        bit loading logic to determine a bit loading configuration for each of the channels based on the variation in the signal-to-noise ratio for each of the channels.

2. The system of claim 1, wherein the signal-to-noise variation logic further comprises logic to calculate a statistical variation of the signal-to-noise ratio based on a mean average of the signal-to-noise ratio, the mean average being calculated from a predetermined number of signal-to-noise ratio measurements.

3. The system of claim 1, wherein the signal-to-noise variation logic further comprises logic to calculate a statistical estimate of the variation of the signal-to-noise ratio for each of the channels based upon an initially determined mean signal-to-noise ratio.

4. The system of claim 1, wherein the signal-to-noise variation logic further comprises:
    logic to maintain a highest signal-to-noise ratio for each of the channels;
    logic to maintain a lowest signal-to-noise ratio for each of the channels; and
    logic to calculate the maximum variation based on the highest and the lowest signal-to-noise ratios.

5. The system of claim 2, wherein the signal-to-noise variation logic further comprises
    logic to measure the signal-to-noise ratio of each channel;
    logic to store a predetermined number of signal-to-noise ratio measurements for each channel on a first-in-first-out basis.

6. A bit loading system in a discrete multi-tone (DMT) transceiver having a plurality of channels, the bit loading system comprising:
    means for determining a variation in a signal-to-noise ratio for each of the channels; and
    means for determining a bit loading configuration for each of the channels based on the variation in the signal-to-noise ratio for each of the channels.

7. The system of claim 6, wherein the means for determining a variation in a signal-to-noise ratio for each of the channels further comprises means for calculating a statistical variation of the signal-to-noise ratio based on a mean average of the signal-to-noise ratio, the mean average being calculated from a predetermined number of signal-to-noise ratio measurements.

8. The system of claim 6, wherein the means for determining a variation in a signal-to-noise ratio for each of the channels further comprises means for calculating a statistical estimate of the variation of the signal-to-noise ratio for each of the channels based upon an initially determined mean signal-to-noise ratio for each of the channels.

9. The system of claim 6, wherein the means for determining a variation in a signal-to-noise ratio for each of the channels further comprises:
    means for maintaining a highest signal-to-noise ratio for each of the channels;
    means for maintaining a lowest signal-to-noise ratio for each of the channels; and
    means for calculating the maximum variation based on the highest and the lowest signal-to-noise ratios.

10. The system of claim 7, wherein the means for determining a variation in a signal-to-noise ratio for each of the channels further comprises:
    means for measuring the signal-to-noise ratio of each channel; and
    means for storing a predetermined number of signal-to-noise ratio measurements for each channel on a first-in-first-out basis.

11. A method for establishing the bit loading configuration of a discrete multi-tone (DMT) transceiver having a plurality of channels, comprising the steps of:

determining a variation in a signal-to-noise ratio for each of the channels; and determining a bit loading configuration for each of the channels based on the a variation in the signal-to-noise ratio for each of the channels.

12. The method of claim 11, wherein the step of determining a variation in a signal-to-noise ratio for each of the channels further comprises the step of calculating a statistical variation of the signal-to-noise ratio based on a mean average of the signal-to-noise ratio, the mean average being calculated from a predetermined number of signal-to-noise ratio measurements.

13. The method of claim 11, wherein the step of determining a variation in a signal-to-noise ratio for each of the channels further comprises the step of calculating a statistical estimate of the variation of the signal-to-noise ratio for each of the channels based upon an initially determined mean signal-to-noise ratio for each of the channels.

14. The method of claim 11, wherein the step of determining a variation in a signal-to-noise ratio for each of the channels further comprises the steps of:

maintaining a highest signal-to-noise ratio for each of the channels;

maintaining a lowest signal-to-noise ratio for each of the channels; and calculating the maximum variation based on the highest and the lowest signal-to-noise ratios.

15. The method of claim 12, wherein the step of determining a variation in a signal-to-noise ratio for each of the channels further comprises the steps of:

measuring the signal-to-noise ratio of each channel; and storing a predetermined number of signal-to-noise ratio measurements for each channel on a first-in-first-out basis.

* * * * *